(12) United States Patent  
Ritz et al.

(10) Patent No.: US 7,743,750 B2
(45) Date of Patent: Jun. 29, 2010

(54) FUEL LIQUID AND VAPOR PRESSURE SENSOR

(75) Inventors: Ronald R. Ritz, Howell, MI (US); Alexander Lux, Ostfildern (DE); Martin Mast, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 74 days.

(21) Appl. No.: 12/273,324

(22) Filed: Nov. 18, 2008

(65) Prior Publication Data

US 2009/0126694 A1    May 21, 2009

Related U.S. Application Data

(60) Provisional application No. 60/988,841, filed on Nov. 19, 2007.

(51) Int. Cl.
*F02M 37/00* (2006.01)
*G01L 7/00* (2006.01)

(52) U.S. Cl. .............. 123/509; 73/714; 73/756
(58) Field of Classification Search .......... 123/509, 123/494; 73/700, 714, 756
See application file for complete search history.

(56) References Cited

U.S. PATENT DOCUMENTS

| | | | |
|---|---|---|---|
| 3,851,666 A | | 12/1974 | Hammond |
| 4,211,119 A | * | 7/1980 | Wolber ................ 73/721 |
| 5,191,870 A | * | 3/1993 | Cook ................ 123/520 |
| 5,267,470 A | * | 12/1993 | Cook ................ 73/49.7 |
| 5,375,472 A | * | 12/1994 | Mitani et al. .......... 73/706 |
| 5,380,279 A | | 1/1995 | Schmidt |
| 5,438,877 A | * | 8/1995 | Vowles et al. ......... 73/756 |
| 5,528,941 A | * | 6/1996 | Ogawa ................ 73/756 |
| 5,563,341 A | | 10/1996 | Fenner et al. |
| 5,614,091 A | | 3/1997 | Janik et al. |
| 5,621,176 A | * | 4/1997 | Nagano et al. ......... 73/714 |
| 5,661,244 A | * | 8/1997 | Nishimura et al. ...... 73/706 |
| 5,789,679 A | * | 8/1998 | Koshimizu et al. ...... 73/756 |
| 5,855,397 A | * | 1/1999 | Black et al. .......... 285/93 |
| 5,918,282 A | * | 6/1999 | Schwager et al. ....... 73/756 |
| 5,988,149 A | * | 11/1999 | Gates ................ 123/568.21 |

(Continued)

FOREIGN PATENT DOCUMENTS

DE          4227893          4/1993

(Continued)

OTHER PUBLICATIONS

PCT/US2008/083921 Search Report and Written Opinion dated Mar. 5, 2009, 14 pages.

(Continued)

*Primary Examiner*—Thomas N Moulis
(74) *Attorney, Agent, or Firm*—Michael Best & Friedrich LLP

(57) ABSTRACT

A combined liquid and vapor sensor assembly includes a body and a mounting portion for coupling the body to a fuel pump module flange that defines an interface between an interior and an exterior of a fuel tank. A liquid pressure sensor is housed in a recess in the body for sensing a liquid pressure of a fuel in the fuel tank, and a vapor pressure sensor is housed in the recess in the body for sensing a vapor pressure of a fuel vapor in the fuel tank. An electrical connector is coupled with the body for providing power to the liquid pressure sensor and the vapor pressure sensor.

20 Claims, 5 Drawing Sheets

U.S. PATENT DOCUMENTS

| | | | |
|---|---|---|---|
| 6,131,445 A * | 10/2000 | Kundrot et al. | 73/114.38 |
| 6,158,270 A * | 12/2000 | Garman et al. | 73/40.7 |
| 6,182,693 B1 | 2/2001 | Stack et al. | |
| 6,302,144 B1 * | 10/2001 | Graham et al. | 137/565.17 |
| 6,436,287 B1 | 8/2002 | Fischerkeller et al. | |
| 7,004,014 B2 | 2/2006 | Perry et al. | |
| 7,028,674 B2 | 4/2006 | Veinotte | |
| 7,032,575 B2 | 4/2006 | Sims, Jr. | |
| 7,117,880 B2 | 10/2006 | Veinotte et al. | |
| 7,418,951 B2 * | 9/2008 | Hazama | 123/509 |
| 2004/0065144 A1 | 4/2004 | Mitani et al. | |
| 2004/0168740 A1 | 9/2004 | Veinotte et al. | |
| 2004/0255657 A1 | 12/2004 | Perry et al. | |
| 2005/0005917 A1 | 1/2005 | Veinotte | |
| 2005/0166681 A1 | 8/2005 | Onoda et al. | |
| 2006/0225709 A1 | 10/2006 | Washeleski et al. | |
| 2007/0212912 A1 | 9/2007 | Osborne et al. | |

FOREIGN PATENT DOCUMENTS

| | | |
|---|---|---|
| DE | 10014550 | 4/2001 |
| WO | 2007082616 | 7/2007 |
| WO | 2007106749 | 9/2007 |

OTHER PUBLICATIONS

Machine translation of DE 42 27 893 A1 generated from esp@cenet on Mar. 24, 2009 (with statement of relevance).

* cited by examiner

FUEL LIQUID AND VAPOR PRESSURE SENSOR

RELATED APPLICATION DATA

This application claims priority to U.S. Provisional Patent Application No. 60/988,841, filed Nov. 19, 2007, the entire content of which is incorporated by reference herein.

BACKGROUND

The invention relates to fuel systems, and more specifically to automotive fuel systems including fuel pump modules.

SUMMARY

Modern automotive fuel systems have increased in complexity. Many current systems include diagnostic monitoring routines, such as engine-off leakage detection routines that require a fuel vapor pressure sensor mounted within the fuel system (often on the fuel pump module flange) to measure fuel tank vapor pressure.

It is also becoming more common for fuel systems to be designed as "demand-based" systems, in which the liquid fuel pressure is monitored with a liquid fuel pressure sensor, and the fuel pump is driven only as much as needed to maintain the demanded fuel pressure. These systems are considered "returnless" systems as only the required amount of fuel is delivered to the fuel injectors. Such systems improve fuel efficiency. In these systems, a liquid fuel pressure sensor is commonly mounted on the fuel rail or in the manifold because there is not enough space to mount it on the flange. As many of the components of the fuel pump module must be in fluid and electrical communication with the outside of the fuel tank, there are numerous fluid couplings and electrical connections in and through the fuel pump module flange. Space on the flange is therefore minimal and there is a need for improved components that minimize the amount of space they consume on the fuel pump module flange.

In one construction, the invention provides a combined fuel liquid and vapor pressure sensor assembly designed to be mounted on a fuel pump module flange. Both the liquid pressure sensor and the vapor pressure sensor are integrated into a single housing or body. Only a single electrical connector interface is needed to electrically connect the liquid pressure sensor and the vapor pressure sensor of the sensor assembly to the automobile's engine control unit (ECU) or other electrical systems. In one embodiment, the fuel outlet from the fuel pump module can passed through the sensor assembly, thereby further integrating the fuel outlet port of the fuel pump module flange with the sensor assembly. The inventive sensor assembly minimizes the number of parts, thereby maximizing available space on the flange of the fuel pump module, and minimizing assembly time and cost.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
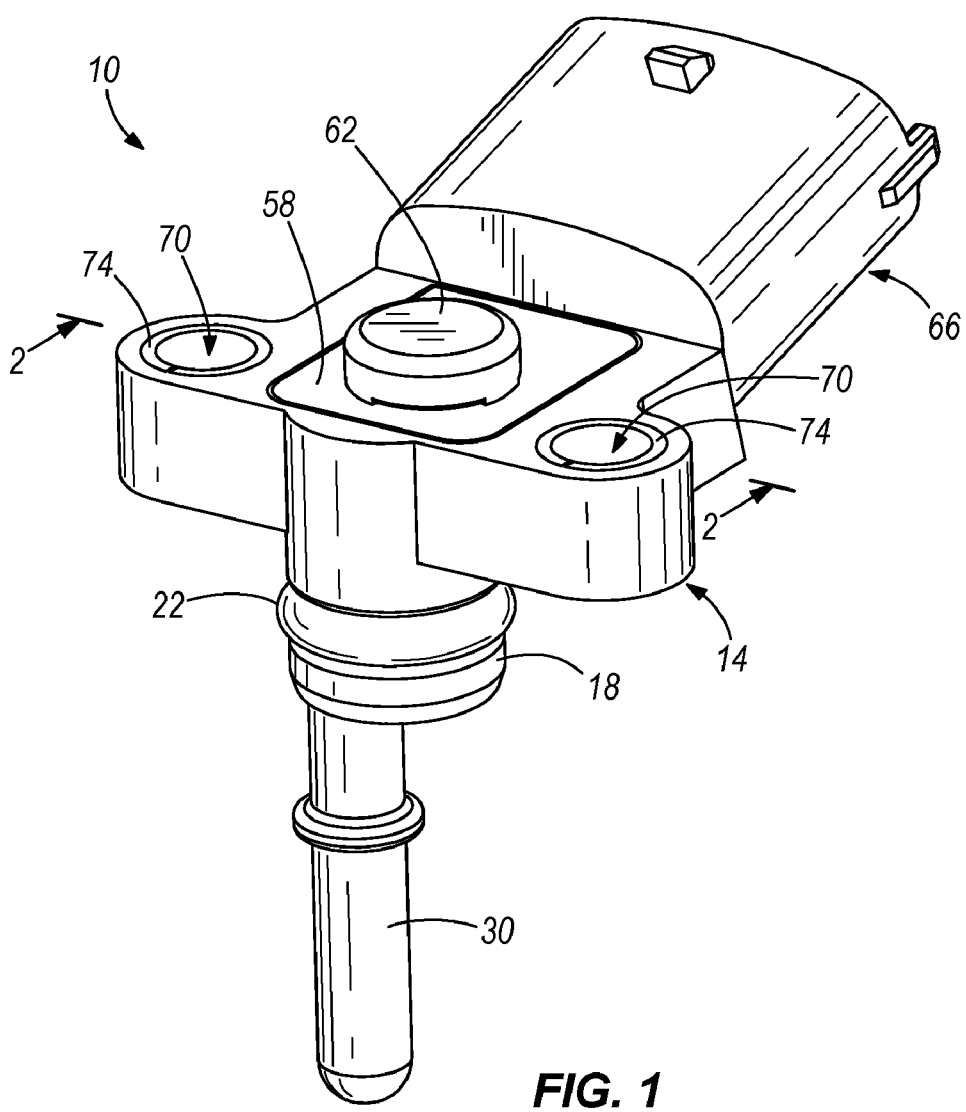
FIG. 1 is a perspective view of a fuel liquid and vapor pressure sensor assembly embodying the invention.
Figure 2:
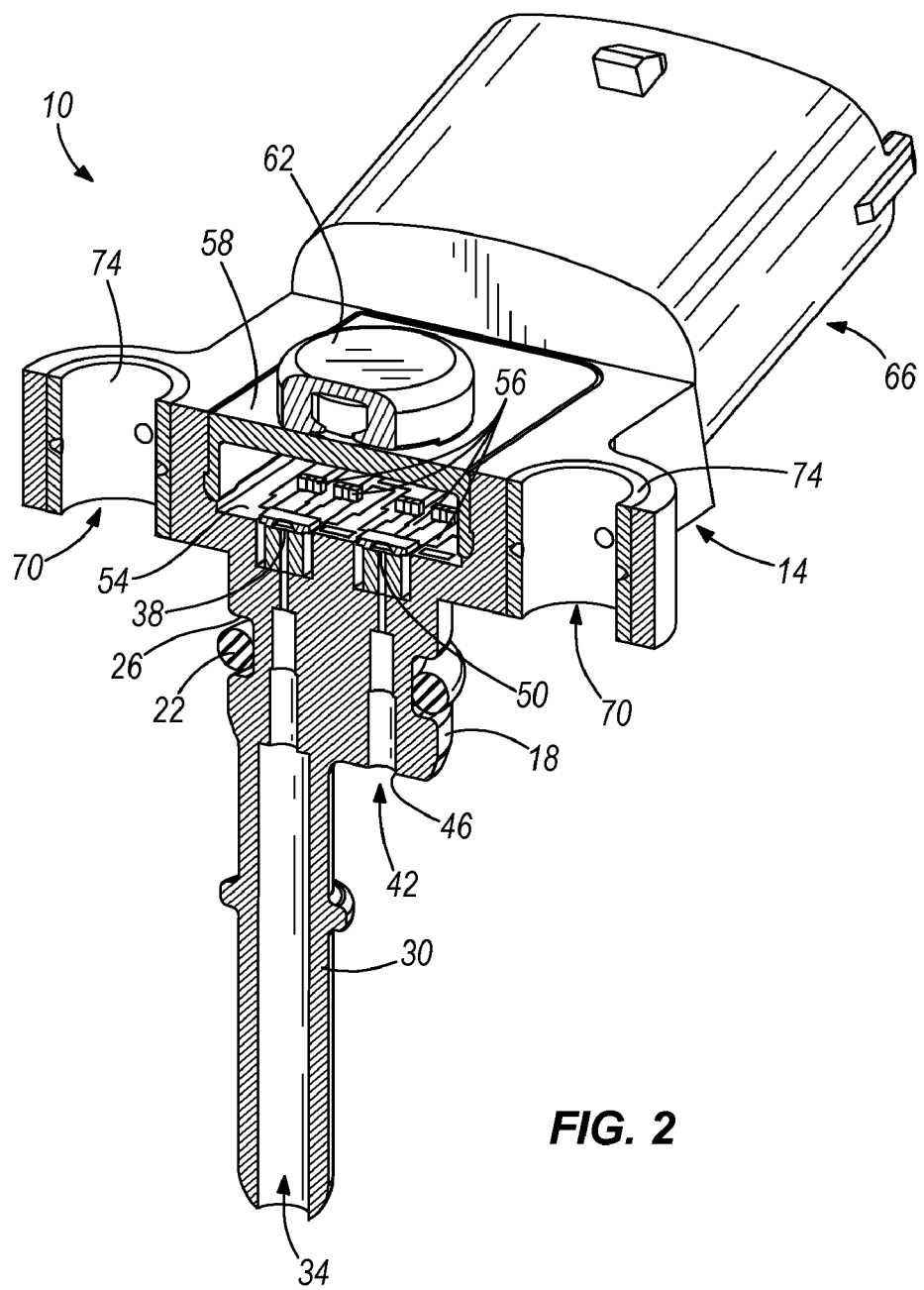
FIG. 2 is a section view of the sensor assembly of FIG. 1.

FIGS. 1 and 2 illustrate a combined fuel liquid and vapor pressure sensor assembly 10 for use with a fuel pump module. The illustrated sensor assembly 10 includes a body portion 14 having a mounting portion or port 18 sized and configured to mount through and within a flange 20 (see FIG. 4—not shown in FIGS. 1-3 for clarity) of the fuel pump module. The flange 20 defines the interface between the interior and the exterior of the fuel tank. Some examples of fuel pump modules having such a flange are shown in U.S. Pat. Nos. 7,032,575 and 6,436,287, the entire contents of which are hereby incorporated by reference.

The illustrated mounting portion 18 is generally cylindrical and includes a seal member in the form of an O-ring 22 received in a groove 26 (see FIG. 2) formed in the outer surface of the mounting portion 18. The O-ring 22 seals the opening in the flange 20 through which the sensor assembly 10 extends. Of course, other seal members or sealing configurations can be substituted for the O-ring 22.

A liquid fuel inlet port 30 extends from the mounting portion 18 (downwardly into the fuel pump module), and as illustrated in FIGS. 1 and 2, is configured for connection (a quick disconnect style connection is illustrated) to a fuel line or hose 32 (see FIG. 4) coupled with the fuel pump. Although the inlet port 30 is shown as a male member, in other constructions, it could also be an opening in the mounting portion 18 that receives a male member. As seen in FIG. 2, the inlet port 30 defines a bore 34 that extends through the port 30, through the mounting portion 18, and into communication with a liquid pressure measuring sensor or chip 38, including a sensing membrane, and housed in the body portion 14 (just above the mounting portion 18 in FIG. 2). The liquid pressure measuring sensor 38 is of a known type operable to measure the pressure of liquid fuel pumped from the fuel pump and directed into the bore 34.

In addition to the bore 34 partially defined within the mounting portion 18, a second hole or bore 42 (see FIG. 2) is formed in the mounting portion 18 adjacent to, but not in fluid communication with the bore 34. The bore 42 includes an inlet 46 in the surface (illustrated in the bottom-most surface) of the mounting portion 18 so as to be in fluid communication with the inside of the fuel tank and the fuel pump module. Fuel vapor pressure communicates through the bore 42 with a vapor pressure monitoring sensor or chip 50, including a sensing membrane, and housed in the body portion 14 (just above the mounting portion 18 in FIG. 2). The vapor pressure measuring sensor 50 is of the known type operable to measure the vapor pressure of fuel within the fuel tank.

Referring to FIG. 2, a recess 54 (also referred to as a cavity) in the body portion 14 houses the electrical componentry 56 (traces, leads, etc.) coupled with the measuring sensors 38 and 50. A cover 58 fits over the recess 54 to substantially close the recess 54, and can include an optional reference air filter cap 62 that provides reference air into the recess 54.

An electrical connector portion 66 is coupled with the body portion 14 providing access for a mating connector 68 (see FIG. 4) to electrically connect with the electrical componentry 56. Therefore, the signals generated by both of the measuring chips 38 and 50 (i.e., sensor cells) can be communicated to the ECU through a single electrical connector, thus saving valuable space on the flange 20 and reducing the number of parts in comparison to alternative arrangements that incorporate a separate liquid fuel pressure sensor and fuel vapor pressure sensor. In the illustrated embodiment, the componentry 56 need only include a single supply voltage (e.g., a 5V supply) and/or a single ground connection (e.g., ground pins) to obtain both of the liquid fuel pressure signal and the fuel vapor pressure signal. Furthermore, only a single physical connection need be made during assembly, thus reducing assembly time. Reducing the number of openings through the flange 20 also reduces the number of pathways for evaporative fuel emissions.

The body portion 14 includes one or more mounting apertures 70 that receive a fastener 72 (see FIG. 4) for securing the sensor assembly 10 to the flange 20 of the fuel pump module. In the illustrated embodiment, the mounting apertures 70 include inserts 74 that improve the strength with which the fasteners 72 secure the sensor assembly 10 to the flange 20. The inserts 74 can be metal or a stronger plastic than that used for the body portion 14 of the sensor assembly 10.

The sensor assembly 10 illustrated in FIGS. 1 and 2 can be formed by insert-molding the measuring chips 38 and 50, the componentry 56, and the inserts 74 into the body portion 14. The O-ring 22 and cover 58 can be added after molding. Of course, other methods for manufacturing the sensor assembly 10 are also contemplated.

Figure 3:
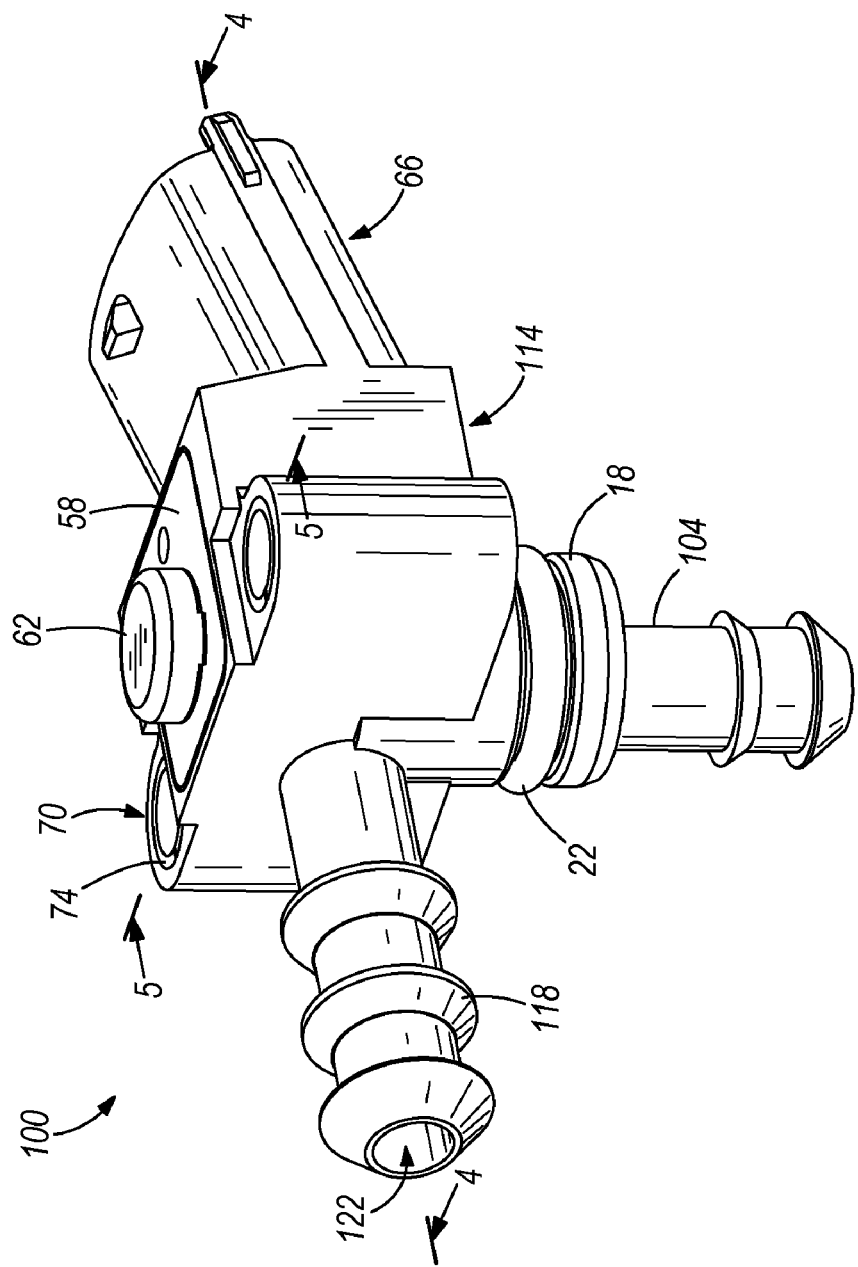
FIG. 3 is a perspective view of an alternative fuel liquid and vapor pressure sensor assembly embodying the invention.
Figure 4:
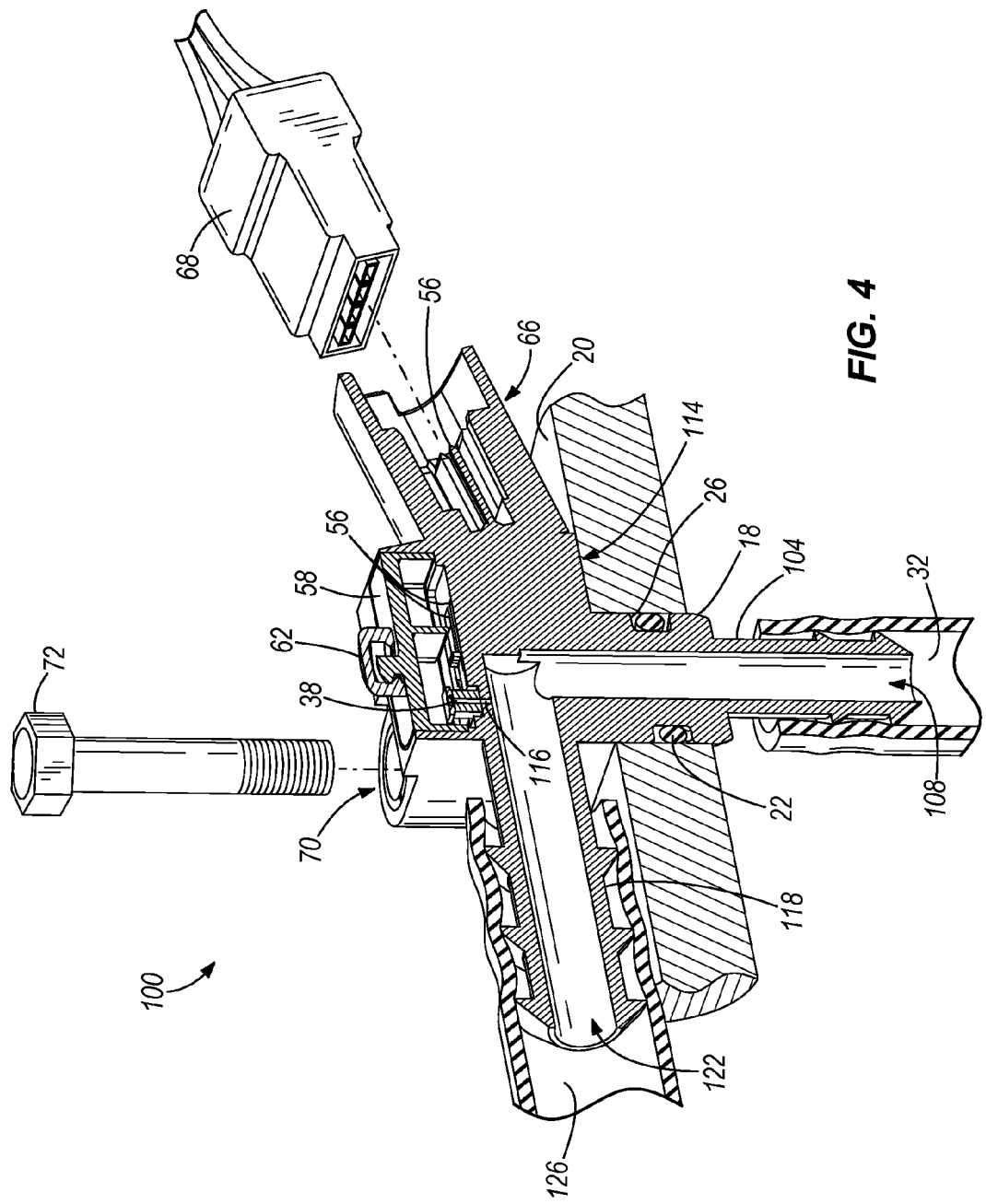
FIG. 4 is a first section view of the sensor assembly of FIG. 3.
Figure 5:
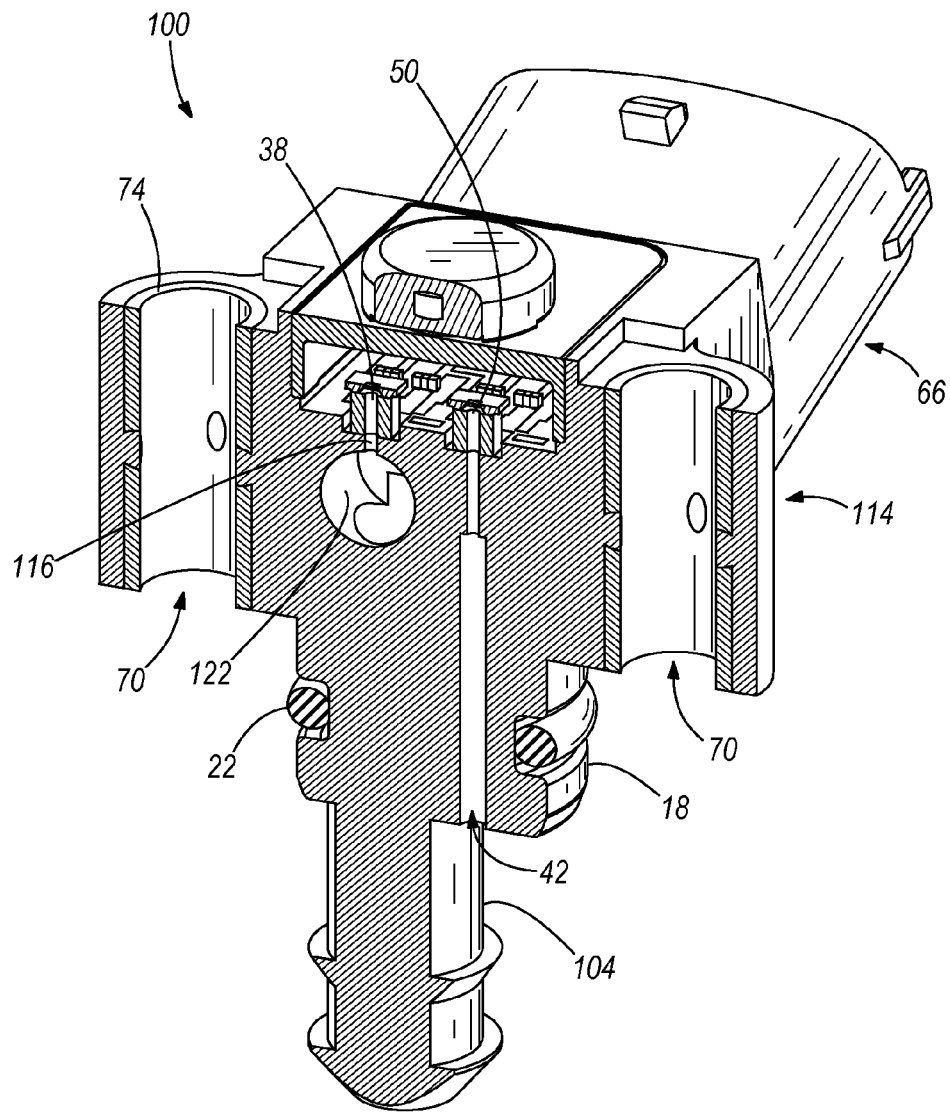
FIG. 5 is a second section view of the sensor assembly of FIG. 3.

FIGS. 3-5 illustrate a fuel liquid and vapor sensor assembly 100 that is a second embodiment of the invention. Like parts have been given like reference numerals and only differences from first embodiment of FIGS. 1 and 2 will be discussed in detail. This embodiment of the sensor assembly 100 further integrates the fuel outlet through the flange 20 into the sensor assembly 100 and may also be referred to as a flange assembly. Specifically, a fuel inlet port 104 of the hose barb style extends from the mounting portion 18. A line or hose 32 (see FIG. 4) from the fuel pump is connected to the inlet port 104 and fuel passes through bore 108 defined in the inlet port 104 and the mounting portion 18, and into communication with the liquid fuel measuring sensor or chip 38 via port or aperture 1 16. However, the body portion 114 further includes a fuel outlet port 118 defining a bore 122 communicating with the bore 108 such that fuel passes past the measuring chip 38 to a fuel outlet line or hose 126 (see FIG. 4) coupled with the outlet port 118 (via the barbed connection as shown in FIGS. 3 and 4 or through a quick disconnect style fitting), and ultimately to the fuel injectors. With this sensor assembly 100, space in the flange 20 of the fuel pump module is further conserved by not only having a single electrical connection for both the liquid fuel pressure and fuel vapor pressure signals generated by the measuring sensors 38 and 50, but also by incorporating the fuel outlet passageway into the sensor assembly 100. Again, fewer pathways through the flange 20 helps reduce evaporative fuel emissions.

The body portion 114 of the sensor assembly 100 is slightly larger (taller as shown in the illustrated embodiment) than the body portion 14 of FIGS. 1 and 2 to provide space for the outlet port 118 and associated bore 122. This results in the inserts 74 being somewhat longer in this embodiment than those shown in FIGS. 1 and 2.

Thus, the invention provides, among other things, a combined liquid and vapor sensor assembly. Various features and advantages of the invention are set forth in the following claims.

What is claimed is:

1. A combined liquid and vapor sensor assembly comprising:
   a body;
   a mounting portion for coupling the body to a fuel pump module flange that defines an interface between an interior and an exterior of a fuel tank;
   a liquid pressure sensor housed in a recess in the body for sensing a liquid pressure of a fuel in the fuel tank;
   a vapor pressure sensor housed in the recess in the body for sensing a vapor pressure of a fuel vapor in the fuel tank; and
   an electrical connector coupled with the body for providing power to the liquid pressure sensor and the vapor pressure sensor.

2. The combined liquid and vapor sensor assembly of claim 1, further comprising a passageway in the mounting portion that provides communication between the fuel and the liquid pressure sensor.

3. The combined liquid and vapor sensor assembly of claim 2, further comprising an inlet port coupled to the mounting portion that includes a bore formed therein to provide fluid communication between the fuel and the passageway.

4. The combined liquid and vapor sensor assembly of claim 2, further comprising a fuel outlet port coupled to the body and including an outlet bore formed therein that communicates with the passageway to enable the fuel to pass through the sensor assembly.

5. The combined liquid and vapor sensor assembly of claim 1, further comprising a passageway in the mounting portion that provides communication between the fuel vapor and the vapor pressure sensor.

6. The combined liquid and vapor sensor assembly of claim 1, further comprising
   a cover configured to close the recess, and
   a cap coupled to the cover that allows air to communicate between an interior of the recess and an exterior of the recess, for providing reference air to the liquid pressure sensor and the vapor pressure sensor.

7. The combined liquid and vapor sensor assembly of claim 1, further comprising a plurality of mounting apertures in the body configured to receive respective fasteners for mounting the combined liquid and vapor sensor assembly to the fuel pump module flange.

8. The combined liquid and vapor sensor assembly of claim 1, further comprising
   a first passageway in the mounting portion that provides communication between the fuel and the liquid pressure sensor, and
   a second passageway in the mounting portion that provides communication between the fuel vapor and the vapor pressure sensor.

9. The combined liquid and vapor sensor assembly of claim 8, further comprising a fuel outlet port coupled to the body and including an outlet bore formed therein that communicates with the first passageway to enable the fuel to pass through the sensor assembly.

10. The combined liquid and vapor sensor assembly of claim 1, wherein the mounting portion further includes a sealing member operable to seal an interface between the mounting portion and the flange.

11. A fuel pump module assembly comprising:
a flange that defines an interface between an interior and an exterior of a fuel tank;
a combined liquid and vapor sensor assembly secured to the flange and including,
a body;
a mounting portion for coupling the body to the flange;
a liquid pressure sensor housed in a recess in the body for sensing a liquid pressure of a fuel in the fuel tank;
a vapor pressure sensor housed in the recess in the body for sensing a vapor pressure of a fuel vapor in the fuel tank; and
an electrical connector coupled with the body for providing power to the liquid pressure sensor and the vapor pressure sensor.

12. The fuel pump module assembly of claim 11, further comprising a passageway in the mounting portion that provides communication between the fuel and the liquid pressure sensor.

13. The fuel pump module assembly of claim 12, further comprising an inlet port coupled to the mounting portion that includes a bore formed therein to provide fluid communication between the fuel and the passageway.

14. The fuel pump module assembly of claim 12, further comprising a fuel outlet port coupled to the body and including an outlet bore formed therein that communicates with the passageway to enable the fuel to pass through the sensor assembly.

15. The fuel pump module assembly of claim 11, further comprising a passageway in the mounting portion that provides communication between the fuel vapor and the vapor pressure sensor.

16. The fuel pump module assembly of claim 11, further comprising
a cover configured to close the recess, and
a cap coupled to the cover that allows air to communicate between an interior of the recess and an exterior of the recess, for providing reference air to the liquid pressure sensor and the vapor pressure sensor.

17. The fuel pump module assembly of claim 11, further comprising a plurality of mounting apertures in the body configured to receive respective fasteners for mounting the combined liquid and vapor sensor assembly to the fuel pump module flange.

18. The fuel pump module assembly of claim 11, further comprising
a first passageway in the mounting portion that provides communication between the fuel and the liquid pressure sensor, and
a second passageway in the mounting portion that provides communication between the fuel vapor and the vapor pressure sensor.

19. The fuel pump module assembly of claim 18, further comprising a fuel outlet port coupled to the body and including an outlet bore formed therein that communicates with the first passageway to enable the fuel to pass through the sensor assembly.

20. The fuel pump module assembly of claim 11, wherein the mounting portion further includes a sealing member operable to seal an interface between the mounting portion and the flange.

* * * * *